(12) United States Patent
Lin et al.

(10) Patent No.: US 7,865,936 B2
(45) Date of Patent: *Jan. 4, 2011

(54) SYSTEM AND METHOD FOR CONTROLLING ACCESS TO MULTIPLE PUBLIC NETWORKS AND FOR CONTROLLING ACCESS TO MULTIPLE PRIVATE NETWORKS

(75) Inventors: Paul Lin, Fremont, CA (US); Henry Hon, Berkeley, CA (US); Fred Cheng, Union City, CA (US)

(73) Assignee: Authenex, Inc., San Jose, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/021,071

(22) Filed: Jan. 28, 2008

(65) Prior Publication Data
US 2008/0235775 A1 Sep. 25, 2008

Related U.S. Application Data

(63) Continuation of application No. 10/675,888, filed on Sep. 29, 2003, now Pat. No. 7,334,255.

(51) Int. Cl.
*H04L 29/00* (2006.01)

(52) U.S. Cl. .......................................... 726/2; 713/168

(58) Field of Classification Search ...................... 726/2
See application file for complete search history.

(56) References Cited

U.S. PATENT DOCUMENTS 5,987,134 A * 11/1999 Shin et al. .................... 713/159
7,334,255 B2 * 2/2008 Lin et al. ........................ 726/2

* cited by examiner

*Primary Examiner*—Matthew B Smithers
(74) *Attorney, Agent, or Firm*—David R. Stevens; Stevens Law Group

(57) ABSTRACT

A system and method for controlling access to multiple public networks and for controlling access to multiple private networks is provided. Authentication is used with unique public shared secrets and unique private shared secrets to control access to the networks. The invention includes a user device for communicating with at least a public network and/or a private network. The device may be capable of accessing multiple networks through one or more private networks with multiple access control servers. The user device must provide a correct response to each access control server, before access to the network may be granted. The device generates a one-time password, or response, to gain access to a controlled network server. The response generated by the device is matched to a response generated by an access control server that may have generated a challenge that prompted the response. If the two responses match, the device is authenticated and a user of the device is granted access to the network server.

19 Claims, 4 Drawing Sheets

SYSTEM AND METHOD FOR CONTROLLING ACCESS TO MULTIPLE PUBLIC NETWORKS AND FOR CONTROLLING ACCESS TO MULTIPLE PRIVATE NETWORKS

CROSS-REFERENCE TO RELATED APPLICATIONS

This Application is a non-provisional application of Provisional Application No. 60/415,276, filed on Sep. 30, 2002.

BACKGROUND OF THE INVENTION

1. Field of the Invention

The present invention relates to a system and method for controlling access to multiple public networks and for controlling access to multiple private networks.

2. Background Information

The Internet is fast becoming the primary platform for global commerce and communications. The ease of communication that encourages the Internet's growth also makes it difficult to ensure the security of Internet transactions. Users of the Internet require mechanisms that guarantee the integrity of the information they transmit over the Internet and provide the same level of trust as paper-based transactions.

Before committing sensitive communications to the Internet, users require specific assurances. Firstly, electronic transactions need to be confidential and protected from tampering. Secondly, they need to be able to trust that participants are who they claim to be. Lastly, they want to be assured that no one can deny their involvement in a transaction after the fact.

Public key cryptography uses a mathematical algorithm, or key, to encrypt data, and a related mathematical key to decrypt the data. Authorized users of public key cryptography receive encryption software and a key pair. The keys in a key pair are related so that a message encrypted with a users public key can only be decrypted using the corresponding private key. One key is an accessible public key, and the other key is a private key that the user must keep secret. In Public key cryptography, public keys are published in electronic directories.

Known encryption key pairs include asymmetric key pairs and symmetric key pairs. In asymmetric key encryption, the encryption and decryption keys are different and the keys are the same in symmetric key encryption. An example of asymmetric key encryption is Public Key Infrastructure (PKI).

Public Key Infrastructure (PKI comprises a framework of policies, services, hardware, and encryption software that is based on the use of public key cryptography. The asymmetric key pairs of PKI include a public key and a private key. In use, A desires to send a message to B. The public key of B is distributed to A. A uses the public key to encrypt the message sent to B. When the encrypted message is received by B, it is decrypted with the private key held by B. The opposite is true as well. Data encrypted with a private key can be decrypted with the use of the public key. This inhibits unauthorized decryption of data.

A disadvantage of PKI is that since it is dependent upon private and public keys, designing and building full-featured PKI is difficult. There are significant interoperability and management challenges associated with PKI. Another disadvantage of PKI is the administration and management of certificates.

In symmetric encryption, both parties share a set of encryption keys, i.e. the same key is used to encrypt and decrypt data. This encryption method is also known as "shared key encryption". In use, A uses a predetermined encryption key to encrypt a message to be sent to B. A sends the encrypted message to B. B uses the same encryption key to decrypt the message.

A disadvantage of public key encryption is that it may be vulnerable to "Man-In-The-Middle" (MITM) attacks, since the possessors of the keys may be unable to verify the identity of each other. In an MITM attack, an interceptor uses its own public key, instead of the target's public key, for asymmetric encryption. This allows the interceptor to decrypt confidential data that is intended for the target.

Another known method of obtaining unauthorized access to encrypted data is a "replay" attack. In a replay attack, an attacker may directly use an authentication key, such as a session ID in a URL cookie. The attacker uses the authentication key to obtain or create service to a user's account, while bypassing normal user authentication, such as logging in to the account with the appropriate username or password.

BRIEF SUMMARY OF THE INVENTION

The present invention provides a system and method for controlling access to multiple public networks and for controlling access to multiple private networks. Authentication is used with unique public shared secrets and unique private shared secrets to control access to the networks.

The invention includes a user device capable of communicating with at least a public network and/or a private network. The user device may be capable of accessing multiple networks through one or more private networks with multiple access control servers. Each server may contain a set of public shared secrets, private shared secrets, or both. The user device must provide a correct response to each access control server, before access to a private network may be granted.

The user device may be provided in a readily portable form-factor such as a Personal Digital Assistant (PDA), a token device, or similar electronic device. The user device includes a processor and a memory.

The user device, or device, contains a predetermined number of unique public shared secrets and a number of unique private shared secrets. The public shared secrets are generated during the manufacturing process of the device and stored in its memory. The private shared secrets may be generated by a private access control server and stored in the device's memory. The private access control server can change the private shared secret stored on the device and on a network server controlled by the access control server at any time.

For authentication to gain access to a controlled network server, the device generates a unique one-time password. The one-time password may comprise a unique response, or answer, to a challenge generated by an access control server. The response generated by the device may be a combination of a public shared secret and/or a private shared secret. The response generated by the device is matched to a response generated by the access control server that generated the challenge. The device may generate the response with or without receiving a challenge from an access control server. If the two responses match, the device is authenticated and the user is granted access to the network server.

In use, a user, or client, desires to access a network server, controlled by an access control server, to activate a web site stored on the network server. The client couples a device they possess to a network coupled to the network server. A request to access the network server is transmitted from the device to the access control server over the network. The access control server may generate a challenge in response to the request and transmit the challenge to the device. The access control server may also transmit a network identifier code, or session identification (ID), to the device along with the challenge.

When the challenge is received it is mapped to the device's memory. The challenge functions as a set of instructions for accessing selected data address locations in the device's memory. The values stored in the selected address locations of the memory are sent to the device's processor. The processor, running a data encryption/decryption program, uses the values stored in the selected address locations to generate an encrypted puzzle key.

The encrypted puzzle key is then fed back into the processor along with the network identifier code to generate an encrypted answer, or response, based on the puzzle key and network identifier code. The encrypted response is then transmitted to the access control server.

Similarly, the access control server reads the challenge sent to the device and accesses selected data address locations stored in a database thereof. The values stored in the selected data address locations of the server's database are sent to a processor of the server. The server's processor, running preferably the same data encryption/decryption program running on the device, uses the values stored in the selected address locations to generate an encrypted puzzle key. The encrypted puzzle key is then fed back into the processor along with the network identifier code sent to the device to generate an encrypted response, based on the puzzle key and network identifier code. The access control server then compares its response to the response received from the device. If the two responses match, the user is validated and can access the network server. If the two responses do not match, then the client is not granted access to the network server.

The invention further provides two or more private networks to share public secrets, while maintaining different private shared secrets. A network can require a combination one or more public shared secrets to be used with one or more private shared secrets to authenticate the client.

By way of example, an access control server transmits a challenge to the device. The challenge may include instructions for the device to use a particular private shared secret stored on the device. The device uses the challenge and designated private shared secret to generate a response. The response is transmitted to the server for authentication as discussed above.

Alternatively, a request to access a private network may pass through two or more access control servers prior to the private network. Each access control server may contain its own private shared secret. In order to access the private network, a challenge from a first access control server may be sent to the device. The challenge may designate a particular private shared secret stored on the device, as discussed above. The device generates its response and transmits the response to the first access control server for authentication. Once authenticated, a second access control server may send its challenge to the device that again designates a particular private shared secret stored on the device. The device again generates its response and transmits the response to the second access control server for authentication. This process may be repeated by each access control server encountered prior to contacting the desired private network. Once the device is authenticated by each access control server, the user is granted access to the network.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Disclosed is a system and method for controlling access to multiple public networks and for controlling access to multiple private networks. Authentication is used with unique public shared secrets and unique private shared secrets to control access to the networks. The invention includes a user device for communicating with at least a public network and/or a private network. The user device may be capable of accessing multiple networks through one or more private networks with multiple access control servers. Each server may contain a set of public shared secrets, private shared secrets, or both. The user device must provide a correct response to each access control server, before access to a private network may be granted.

The device generates a one-time password, or response, to gain access to a controlled network server. The response generated by the device is matched to a response generated by an access control server that may have generated a challenge that prompted the response. If the two responses match, the device is authenticated and a user of the device is granted access to the network server.

Figure 1:
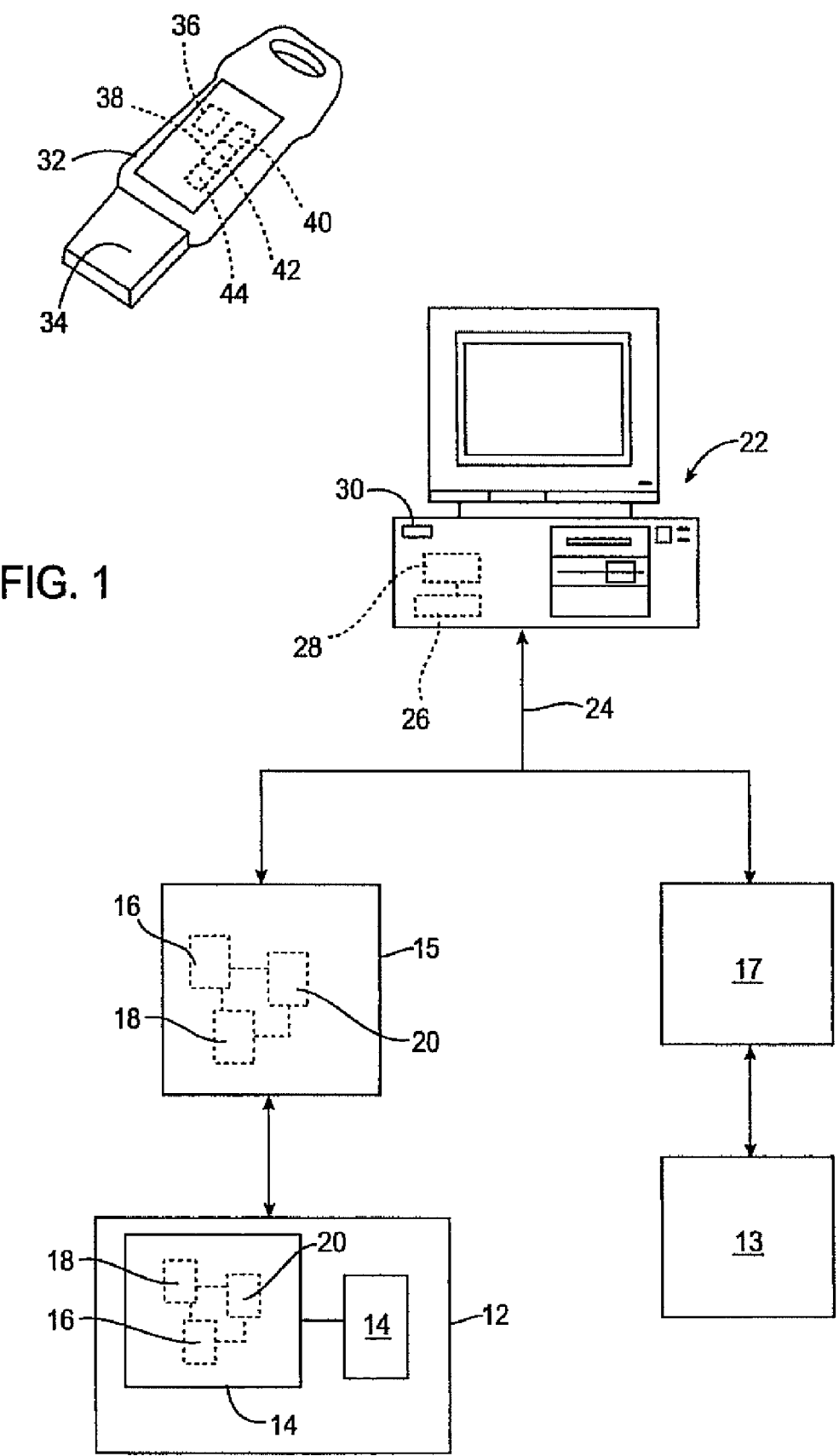
FIG. 1 is a schematic diagram showing a user device coupled to a computer of a computer network of the invention.

Referring to the drawings more particularly by reference numbers, FIG. 1 shows an embodiment of a system 10 of the present invention. The system 10 may include one or more computer networks that may comprise a public network, shown generally at 12, or a private network, shown generally at 13. Either network 12, 13 may comprise a multiplicity of electronically interconnected network servers 14. Examples of computer networks include the Internet, a Remote VPN network, a LAN/WAN network, a wireless network, or any suitable network of computing devices.

Each network server 14 may typically include a processor 16 for processing data, a memory 18 for temporary data storage, and a data storage device 20 for permanent data storage. The data storage device 20 may comprise a hard disk drive or plurality of hard disk drives.

One or more access control servers, such as a public access control server, shown generally at 15, or private access control server, shown generally at 17, may be coupled to either network 12, 13. The public access control server 15 may be provided for controlling access to public data using public encryption/decryption keys, while the private access control server 17 may be provided for controlling access to private data using private encryption/decryption keys or a combination of public and private keys. The encryption keys may be stored in the data storage device 20 and retrieved into memory 18 for use. Retrieval and storage of the encryption/decryption keys may be managed by a database program running on the server's processor 16 and stored on the data storage device 20. It is to be understood that either network 12, 13 may embody an access control server 15, 17.

One or more computers 22 may be electronically coupled to one or more networks 12, 13 at any given time. A computer 22 may be coupled to the networks 12, 13 via any known means. By way of example, the computer 22 may be coupled to the networks 12, 13 via a high bandwidth digital communications line 24 or may be intermittently coupled to the networks 12, 13 via a modem (not shown).

The computer 22 may comprise any device capable of exchanging data with a computer network. By way of example, the computer 22 may comprise any remote located computing terminal, or computer terminal such as a known ATM machine, or a desktop or laptop computer The computer 22 may be provided with a processor 26 for processing data and a memory 28 for temporary data storage. The computer 22 may include a data port 30 to allow coupling of external devices to the networks 12, 13.

The invention includes a user device 32 capable of communicating with both the public network 12 and private network 13. The user device 32 may be capable of accessing multiple public and private networks 12, 13 through one or more private networks with multiple access control servers (thoroughly discussed hereinafter). The user device 32 may be provided in a readily portable form factor that would allow the device 32 to be carried in a user's personal effects. By way of example, the user device 32 may be in the form of a Personal Digital Assistant (PDA), a token device, or similar electronic device. Preferably, the user device 32 may comprise a token device.

An embodiment of the invented token device, or token, 32 may be configured to be detachably coupled to the computer data port 30. A connector 34 of the token 32 and data port 30 may be configured in any desired mutually compatible form factor which affords coupling and decoupling of the token 32 with the data port 30. By way of example, the data port 30 may comprise a known USB (universal Serial Bus) port or similar data port, with the connector 34 provided in a compatible configuration.

The token 32 may include an on-board processor 36 for processing data and a memory device 38 for storing data. The on-board processor 36 may be capable of processing 128-bit data. The processor 36 may be running a data encryption/decryption algorithm, such as an Advanced Encryption Standard (AES) technology data encryption/decryption algorithm.

The memory 38 may comprise a nonvolatile memory device that is configured to maintain data when power is removed. The memory 38 may comprise a flash memory device.

The memory 38 may be functionally partitioned into two or more separate portions. A first portion 40 of the memory 38 may function as an identification (ID) pad. Different data values may be stored in predetermined address locations in the ID pad 40 during manufacture of the token 32. These data values may represent symmetric public shared secrets and may remain unchanged during the life of the token 32.

A second portion 42 of the memory 38 may be provided for storing data values that may represent data encryption/decryption keys. The data values that represent the encryption/decryption keys may also be stored in the key storage portion 42 during manufacture of the token 32 or they may be stored during use of the token 32.

A third portion 44 of the memory 38 may be provided for storing data values that may represent symmetric private shared secrets. The symmetric private shared secrets may be received from a private access control server 17. The private access control server 17 may change the data values stored in the private shared secret portion 42, and thus change the private shared secrets, at any time. A private access control server 17 may also change data values, representing private shared secrets, stored on a server 14 controlled by the private access control server 17 at any time.

The token 32 may be distributed to a user, or client, using any known and applicable distribution means. When a client receives the token 32, they may contact the distributor of the token 32, or other appropriate party, to verify that they possess the token 32. The client contacts the distributor and provides identifying information to the distributor, who verifies the client. At that time, the client may generate user code that may be stored in the token's memory 38. Alternatively, the user may generate the user code prior to, or during, and encryption event.

Figure 2:
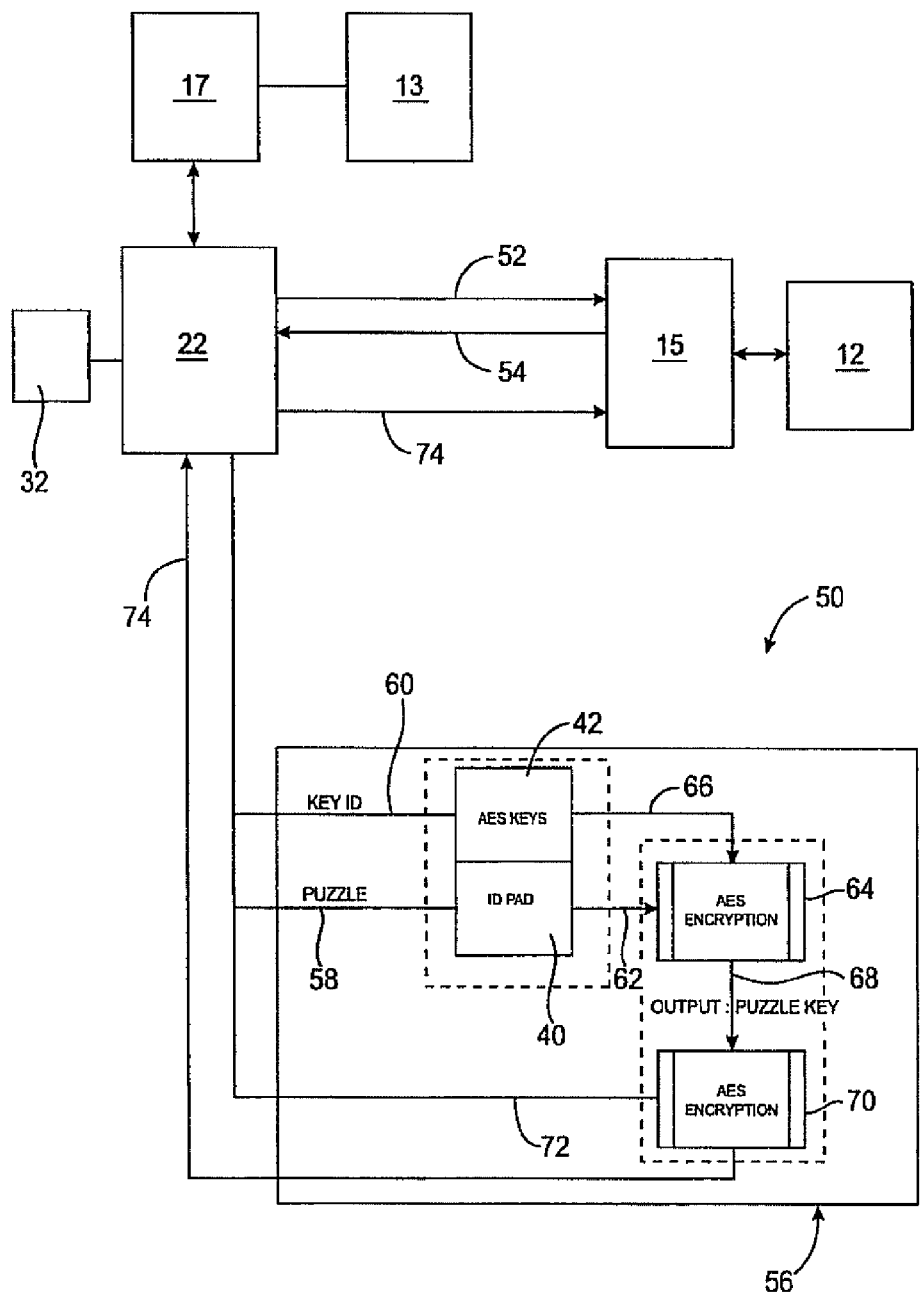
FIG. 2 is a schematic diagram showing an embodiment of data flow of the invented method for gaining access to a controlled network server of the present invention.

Referring now to FIG. 1 and FIG. 2 of the drawings, there is shown generally at 50 a schematic representation of an embodiment of the invented system and method for gaining access to a controlled network. The network 12, 13 may be controlled by either a public access control server 15 or private access control server 17.

By way of example, a client desires to access a public network 12 controlled by an access control server 15 to access data, such as a web site, stored on a server 14 of the network 12. The client couples a token 32 they possess to the computer 22. A request to access the network server 14 is transmitted from the token 32 to the access control server 15, shown at data flow path 52.

The public access control server 15 may generate a challenge in response to the request 52 and transmit the challenge to the token 32, shown at data flow path 54. The challenge may be in the form of a 128-bit number. The challenge may include a challenge puzzle, key ID, and network identifier code, or session identification (ID).

Shown in process block 56, the token's processor 36 commences generating a response to the challenge, by first decomposing the challenge. The processor 36 decomposes the challenge to recover the challenge puzzle, key ID, and session ID. As shown on data flow path 58, the challenge puzzle is mapped to the ID pad portion 40 of memory 38 and the key ID is sent to the key storage portion 40 of memory 38.

The challenge puzzle may function as a set of instructions for accessing selected data address locations in the ID pad 40. The values stored in the selected address locations may represent a symmetric public shared secret. As shown on data flow path 60, the values stored in the address locations, and thus the public shared secret, determined by the challenge puzzle are retrieved and transmitted to the token's processor 36, shown on data flow path 62.

Similarly, the key ID identifies which particular encryption/decryption key stored in the key storage portion 42 will be used to encrypt the public shared secret. The encryption/decryption key identified by the key ID is retrieved from the key storage portion 42 and sent to the processor 36, shown on data flow path 66.

The token's processor 36, preferably running an AES data encryption/decryption algorithm, performs a first round of data encryption, shown in process block 64, to generate and output an encrypted puzzle key, shown on data flow path 68. The first round of data encryption 64 may be performed using the public shared secret and key determined by the challenge.

A second round of encryption, shown in process block 70, may be performed to generate the response to be transmitted to the public access control server 15. The second round of encryption 70 is performed by feeding the encrypted puzzle key back into the processor 36. The session ID is also fed into the processor, shown along data flow path 72, to generate the encrypted response. The encrypted response may be a 128-bit number.

As shown along data flow path 74, the encrypted response is transmitted to the public access control server 15, via the computer 22. Upon receipt of the response generated by the token 32, the public access control server 15 generates an encrypted response using a process and information identical to the process and information used by the token 32.

By way of example, the public access control server 15 reads the challenge sent to the token 32 and accesses selected data address locations stored in its database to retrieve the shared secret and encryption/decryption key determined by the challenge. The shared secret and key are sent to the server's processor 16 that may be running the same data encryption/decryption program running on the token's processor 36. The server's processor 16 performs a first round of encryption using the shared secret and key, to generate an encrypted puzzle key. The processor 16 then performs a second round of encryption using the encrypted puzzle key and session ID to generate an encrypted response. The public access control server 15 compares its response to the response received from the token 32. If the two responses match, the client is validated and can access the network 12. If the two responses do not match, then the client is not granted access to the network 12.

Alternatively, the token may generate a unique one-time password, or response, without receiving a challenge from either the public access control server 15 or private access control server 17. By way of example, the token's processor 36 retrieves data values stored in the selected address locations of the ID pad 40, which may be all or a portion of a public shared secret. The processor also retrieves values stored in selected address locations of the key storage portion 40, to obtain a selected encryption/decryption key.

As discussed above, the processor 36 performs a first round of data encryption using the shared secret and key, to generate an encrypted puzzle key. A second round of encryption may be performed to generate a response to be transmitted to an access control server 15, 17. The second round of encryption 68 may performed by feeding the encrypted puzzle key back into the processor 36. A token identifier code or a designed private shared secret location for a network with multiple access control servers may also be fed into the processor 36, to generate the response.

The response generated by the token 32 is then transmitted to the access control server 15, 17. The server 15, 17 performs the first and second rounds of encryption and previously discussed. The server 15, 17 may use a token identifier code, stored in its database, in its second round of encryption to generate its response. The response generated by the server 15, 17 is matched to the response generated the token 32. If the two responses match, the token 32 is authenticated and the client is granted access to the desired network 12, 13.

Figure 3:
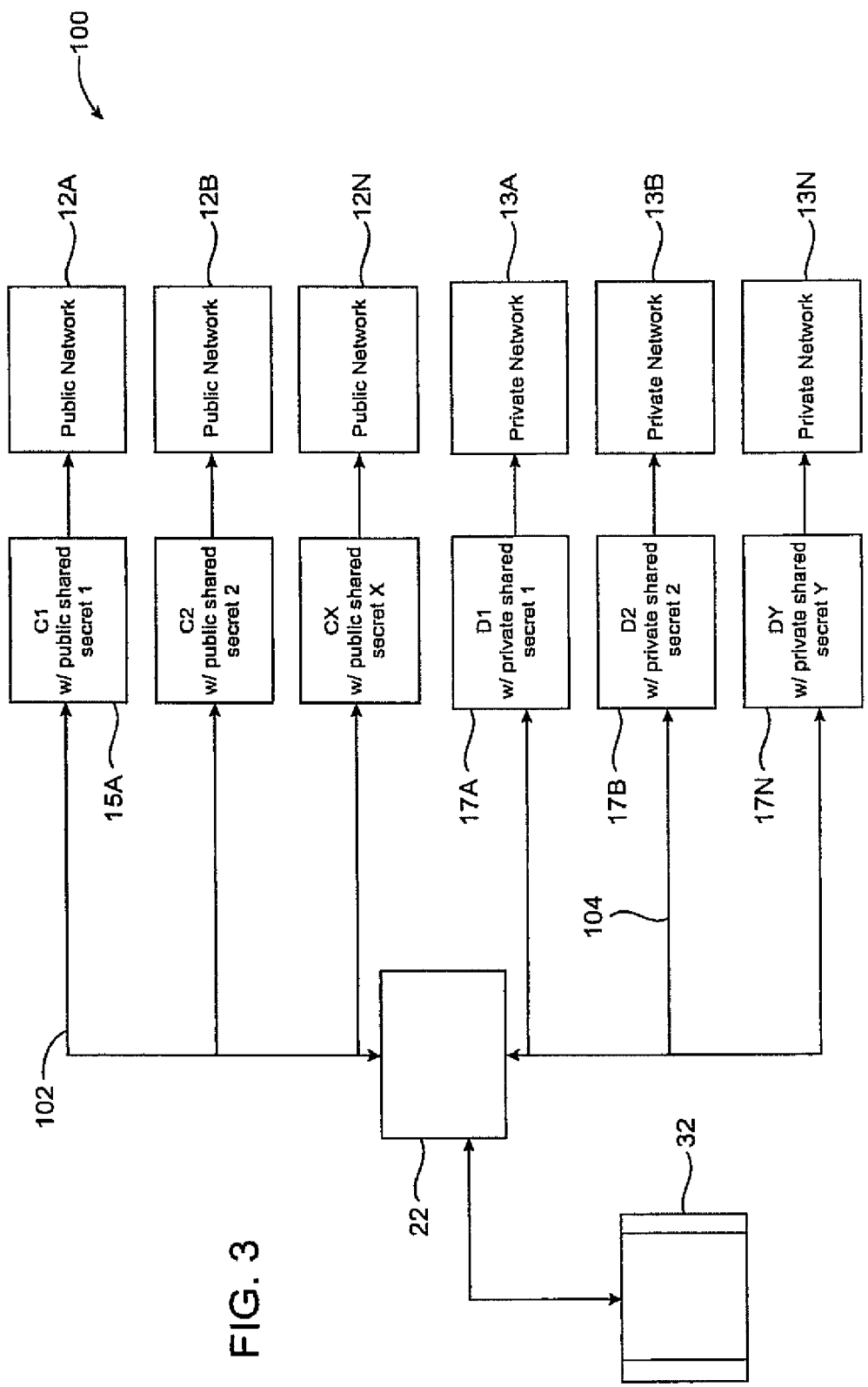
FIG. 3 is a schematic diagram showing an embodiment of data flow of the invented method for authenticating a client using public shared secrets and private shared secrets of the present invention.

Referring to the drawing Figures, and particularly to FIG. 3, an embodiment of the invented method for controlling access to multiple public computer networks and for controlling access to multiple private computer networks is shown, generally at 100. The token 32 may be used to authenticate a client to gain access to multiple public computer networks 12A, 12B, 12N, or multiple private computer networks 13A, 13B, 13N, or both.

A public shared secret corresponding to each public network 12 that the client may desire to access may be stored in the memory 38 of the token 32 during manufacture thereof. A client desires to access a selected public network 12A. As discussed in detail with reference to FIG. 2, the client couples a token 32 the posses to a computer, or computing terminal, 22 coupled to the network 12A. The token 32 transmits a request to access the network 12A to the public access control server 15A of the network 12A, shown at data flow path 102. The public server 15A generates a challenge in response to the request and transmits the challenge to the token 32.

The token's processor 36 generates a response to the challenge, by first decomposing the challenge, which may include the challenge puzzle and key ID. The challenge may optionally include a session ID. The challenge puzzle is mapped to the ID pad portion 40 of memory 38 for retrieving the symmetric public shared secret indicated by the challenge from memory 38. The token 32 then generates the response and transmits the response back to the server 15A. Upon receipt of the token's response, the server 15A generates its response as discussed. If the two responses match, the client is granted access to the public network 12A.

The token 32 may also be used to authenticate a client to gain access to multiple private computer networks 13A, 13B, 13N. A private access control server 17A, 17B, 17N may be provided for controlling access to each private network 13A, 13B, 13N. All or a portion of each public shared secret stored in the token's memory 38 may be stored in a database of each private access control server 17A, 17B, 17N.

Each private access control server 17A, 17B, 17N may be provided with its own unique set of private shared secrets, for controlling access to the corresponding private network 13A, 13B, 13N. A private access control server 17 may change the private keys stored in the token's memory 38 or on its corresponding private network 13.

A client desires to access a selected private network 13B. As discussed in detail with reference to FIG. 2, the client couples a token 32 the posses to a computer, or computing terminal 22, coupled to the private network 13B. The token 32 transmits a request to access the network 13B to the private access control server 17B of the network 13B, shown at data flow path 104. The server 17B generates a challenge in response to the request and transmits the challenge to the token 32.

The token's processor 36 generates a response to the challenge, by first decomposing the challenge, which may include the challenge puzzle and key ID. The challenge may optionally include a session ID. The challenge puzzle is mapped to both the ID pad portion 40 for retrieving the symmetric public shared secret and to the private shared secret portion 44 for retrieving the symmetric private shared secret indicated by the challenge. The token 32 then generates the encrypted response comprising a combination of a public shared secret and a private shared secret, and transmits the response back to the server 17B. Upon receipt of the token's response, the server 17B generates its response as discussed. If the two responses match, the client is granted access to the private network 13B.

Figure 4:
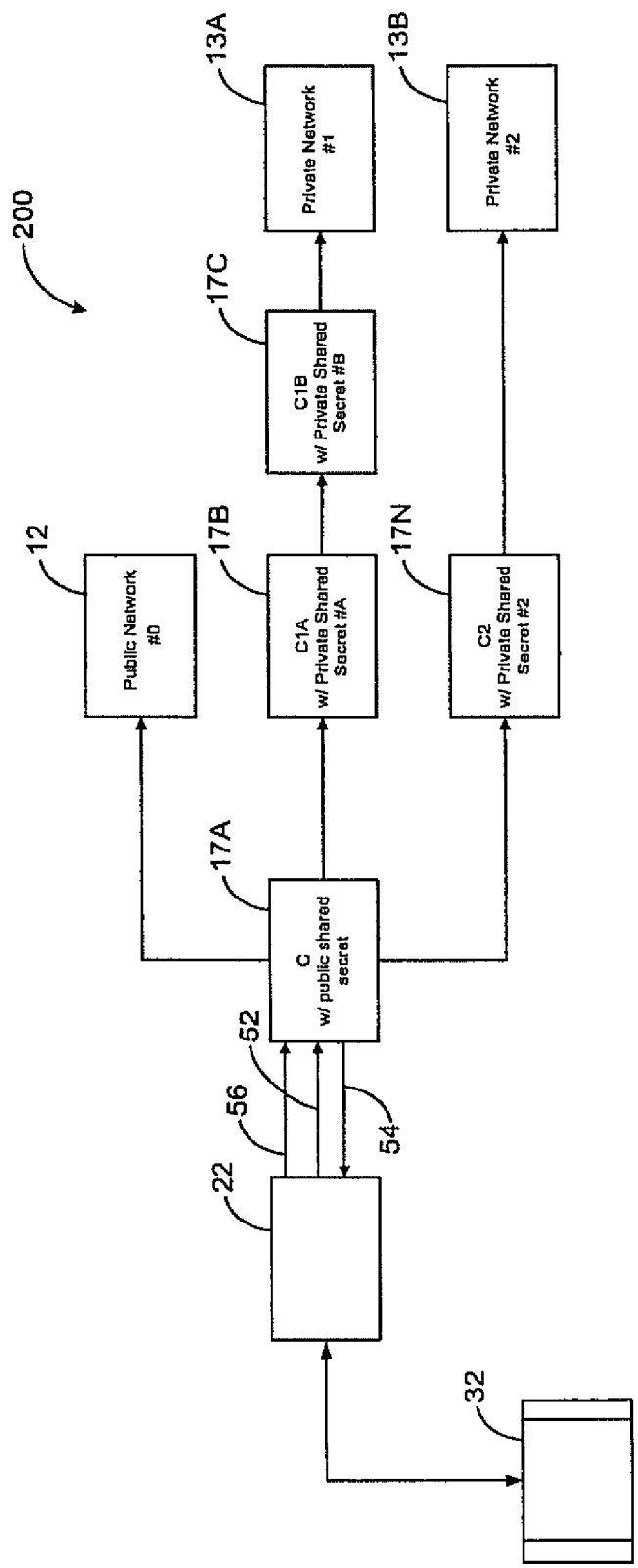
FIG. 4 is a schematic diagram showing an embodiment of data flow of the invented method for authenticating a client to two or more private networks that my share public secrets, while maintaining different private shared secrets of the present invention.

Referring to FIG. 4, an embodiment of the invented method for controlling access to multiple public computer networks and for controlling access to multiple private computer networks is shown, generally at 200. The token 32 may be used to authenticate a client to gain access to multiple public computer networks 12 or multiple private computer networks 13A, 133, or both.

A client desires to access a selected private network 13A. As discussed in detail with reference to FIG. 2, the client couples a token 32 they possess to a computer 22. The token 32 transmits a request to access the network 13A to private access control server 17A of the network 13A, shown at data flow path 52. The server 17A generates a challenge that includes the address of a designated private shared secret stored in the token's memory 38, in response to the request and transmits the challenge to the token 32, shown at data flow path 54.

The token's processor 36 generates a response to the challenge, by first decomposing the challenge, which may include the challenge puzzle and key ID, along with the designated private shared secret location determined by the server 17A. The token 32 then generates the encrypted response comprising a combination of a public shared secret and the designated private shared secret, and transmits the response back to the server 17A, shown on data flow path 56. Upon receipt of the token's response, the private access control server 17A generates its response as discussed.

If the two responses match, the token 32 is authenticated. Once authenticated, a second private access control server 17B may send its challenge to the token 32, to again authenticate to that server 17B. Similarly, the server 17B again designates a particular private shared secret stored on the token 32. The token 32 again generates its response and transmits the response to is the second access control server 17B for authentication. This process may be repeated by each access control server 17 encountered prior to contacting the desired private network 13A. Once the device is authenticated by each access control server 17A, 17B, 17C, the token 32, and thus client, is granted access to the network 13A.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for controlling access to a network, the method comprising:
    (a) receiving a first response containing a shared secret from a user device coupled to the network, wherein the user device contains a plurality of shared secrets;
    (b) generating a second response upon receipt of the first response;
    (c) comparing the first response and the second response; and
    (d) authenticating the user device if the first response and the second response match, and not authenticating the user device if the first response and the second response do not match.

2. The method of claim 1 wherein the first response includes a public shared secret.

3. The method of claim 1 wherein the first response includes a private shared secret.

4. The method of claim 1 wherein the first response includes a public shared secret and a private shared secret.

5. The method of claim 1 wherein the second response includes a public shared secret.

6. The method of claim 1 wherein the second response includes a private shared secret.

7. The method of claim 1 wherein the second response is generated by an access control server coupled to the network.

8. A method comprising:
    (a) receiving a request from a user device to access a network;
    (b) transmitting a challenge to the user device, wherein the challenge includes instructions for accessing selected data in the user device;
    (c) receiving a first response from the user device having a shared secret;
    (d) generating a second response based the first response;
    (e) comparing the first response and the second response; and
    (f) authenticating the user device if the first response and the second response match, and not authenticating the user device if the first response and the second response do not match.

9. The method of claim 8 wherein the first response includes a symmetric public shared secret.

10. The method of claim 8 wherein the first response includes a symmetric private shared secret.

11. The method of claim 8 wherein the first response includes a symmetric public shared secret and a symmetric private shared secret.

12. The method of claim 8 wherein the second response includes a symmetric public shared secret.

13. The method of claim 8 wherein the second response includes a symmetric private shared secret.

14. The method of claim 8 wherein the second response is generated by the network.

15. A method for controlling access to a public network, the method comprising:
    (a) receiving an access request from a user device coupled to a public network server;
    (b) transmitting a challenge from the public network server to the user device, wherein the user device includes a plurality of shared secrets;
    (c) receiving a first response from the user device, wherein the first response is generated using one of the plurality of shared secrets;
    (d) generating a second response upon receipt of the first response by the public network server;
    (e) comparing the first response and the second response; and
    (f) authenticating the user device to grant access to the public network if the first response and the second response match, and not authenticating the user device if the first response and the second response do not match.

16. The method of claim 15 wherein the first response includes a symmetric public shared secret.

17. The method of claim 15 wherein the second response includes a symmetric public shared secret.

18. The method of claim 15 wherein the second response is generated by the server.

19. A method for controlling access to a private or public network, the method comprising:
    (a) coupling a user device to a network including a server;
    (b) transmitting an access request from the user device to the server;
    (c) transmitting a challenge from the server to the user device, wherein the challenge includes instructions for accessing selected data in the user device;
    (d) processing the challenge to ascertain at least a selected private or public shared secret stored on the user device;
    (e) generating a first response using at least the selected private or public shared secret;
    (f) transmitting the first response to the server;
    (g) generating a second response upon receipt of the first response by the server;
    (h) comparing the first response and the second response; and
    (i) authenticating the user device to grant access to the private or public network if the first response and the second response match, and not authenticating the user device if the first response and the second response do not match.

* * * * *